United States Patent
Bar et al.

(10) Patent No.: US 9,841,780 B2
(45) Date of Patent: Dec. 12, 2017

(54) APPARATUS AND METHOD FOR PRODUCING A REPORT INCLUDING A SUBSET OF A PLURALITY OF ACTIVE TIMERS BASED ON A QUERY TO ACCURATE QUALITY OF SERVICE BASED ON THE REPORT

(71) Applicants: Ron-Michael Bar, Ramat-Hasharon (IL); Eran Glickman, Rishon le Zion (IL); Amir David Modan, Omer (IL)

(72) Inventors: Ron-Michael Bar, Ramat-Hasharon (IL); Eran Glickman, Rishon le Zion (IL); Amir David Modan, Omer (IL)

(73) Assignee: NXP USA, INC., Austin, TX (US)

( * ) Notice: Subject to any disclaimer, the term of this patent is extended or adjusted under 35 U.S.C. 154(b) by 497 days.

(21) Appl. No.: 14/324,352

(22) Filed: Jul. 7, 2014

(65) Prior Publication Data
US 2016/0004274 A1    Jan. 7, 2016

(51) Int. Cl.
*G06F 1/04* (2006.01)
*G06F 1/14* (2006.01)
*G06F 17/30* (2006.01)
*H04L 1/18* (2006.01)
*G06F 9/44* (2006.01)

(52) U.S. Cl.
CPC .............. *G06F 1/14* (2013.01); *G06F 9/4443* (2013.01); *G06F 17/30979* (2013.01); *H04L 1/1883* (2013.01)

(58) Field of Classification Search
CPC ........ G06F 1/14; G06F 9/4825; G06F 9/4837; H04L 1/188
See application file for complete search history.

(56) References Cited

U.S. PATENT DOCUMENTS

| | | | |
|---|---|---|---|
| 5,297,275 A * | 3/1994 | Thayer | G06F 13/24 710/260 |
| 6,718,479 B1 * | 4/2004 | Christenson | G06F 1/14 713/502 |
| 6,732,287 B1 * | 5/2004 | Siorek | G06F 1/14 713/500 |
| 6,826,761 B1 | 11/2004 | Damon et al. | |
| 8,219,845 B2 | 7/2012 | Li et al. | |
| 9,092,143 B1 * | 7/2015 | Bappe | G06F 11/3485 |
| 2003/0172314 A1 * | 9/2003 | Walter | G06F 1/14 713/502 |
| 2006/0208829 A1 * | 9/2006 | Earhart | G06F 9/4825 333/133 |
| 2008/0013450 A1 * | 1/2008 | Worley | G06F 17/30551 370/230 |
| 2009/0259870 A1 * | 10/2009 | Sharma | G06F 9/45533 713/400 |

* cited by examiner

*Primary Examiner* — Thomas Lee
*Assistant Examiner* — Zhipeng Wang

(57) ABSTRACT

An apparatus including: an input interface configured to enable user configuration of a future time window; and a report interface configured to produce a report relating to a first sub-set of a plurality of active timers that expire at programmed future points in time, wherein the first sub-set of the plurality of active timers expire during the user-configured future time window.

17 Claims, 5 Drawing Sheets

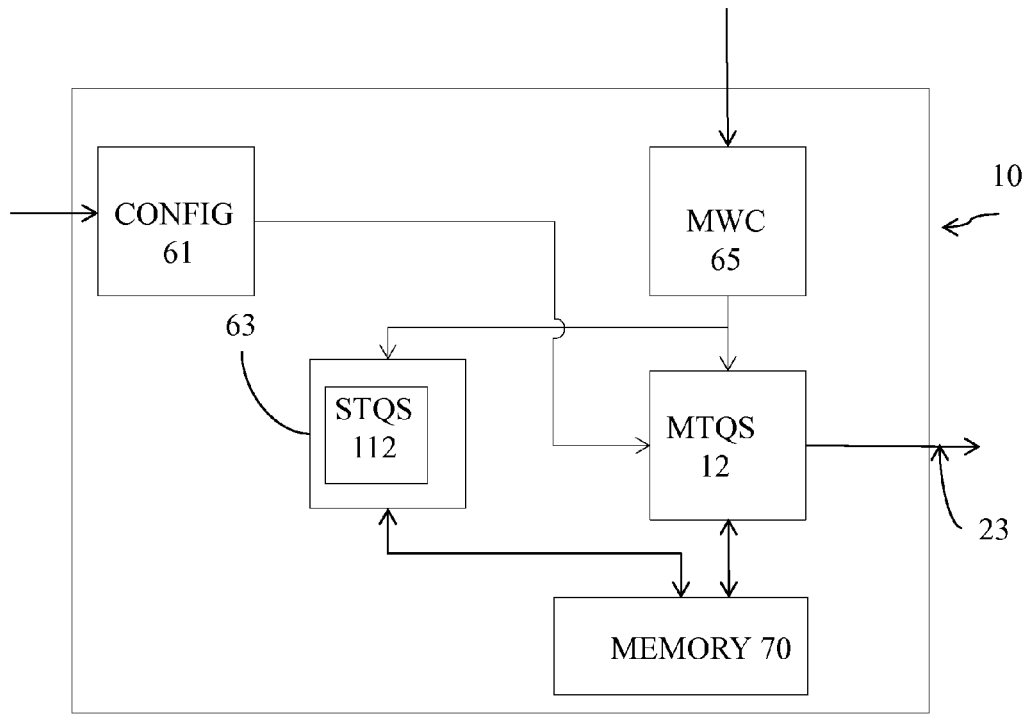
FIG. 11
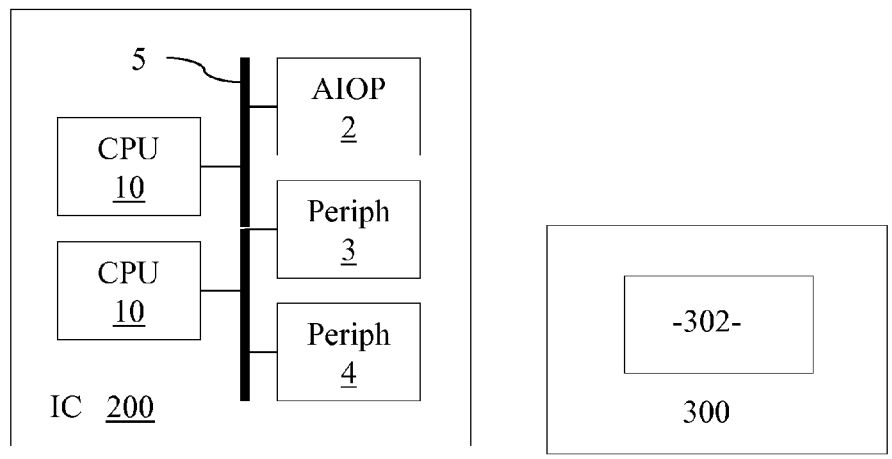
FIG. 12
FIG. 13

APPARATUS AND METHOD FOR PRODUCING A REPORT INCLUDING A SUBSET OF A PLURALITY OF ACTIVE TIMERS BASED ON A QUERY TO ACCURATE QUALITY OF SERVICE BASED ON THE REPORT

FIELD OF THE INVENTION

This invention relates to an apparatus, a method and machine readable instructions for querying timers.

BACKGROUND OF THE INVENTION

It is often the case that an apparatus, and in particular a data processing apparatus, is configured to operate in a reliable and deterministic way. A processing apparatus may use hundreds, thousands, millions or more timers to manage the operation of the apparatus. Activities that relate to timers therefore have the potential to use significant processing resources.

SUMMARY OF THE INVENTION

The present invention provides an apparatus, a method and machine readable instructions for querying timers as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 11 shows a block diagram of an example of another apparatus comprising a single-timer query system and one or more multiple-timer query systems;

FIG. 12 shows a block diagram of an example of the apparatus configured as an integrated circuit (IC); and FIG. 13 shows an example of a set of machine readable instructions embodied on a record carrier.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
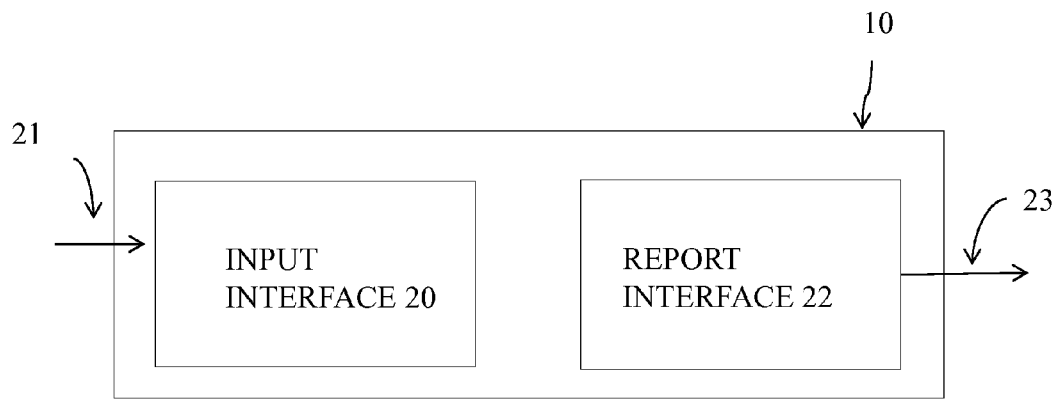
FIG. 1 shows a block diagram of an example of an apparatus comprising: an input interface and a report interface.
Figure 3:
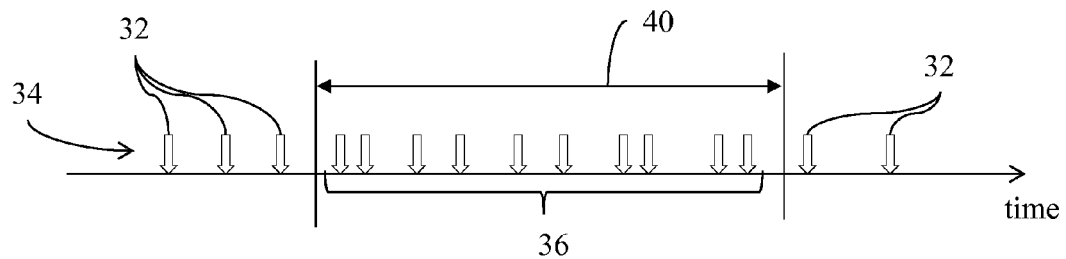
FIG. 3 schematically shows a timing diagram illustrating a future time window in relation to expiry times of a plurality of timers.

The Figures, including FIGS. 1 and 3, illustrate examples of an apparatus 10 comprising: an input interface 20 configured to enable user configuration 21 of a future time window 40; and a report interface 22 configured to produce a report 23 relating to a first sub-set 36 of a plurality 34 of active timers 32 of the apparatus that expire at programmed future points in time, wherein the first sub-set 36 of the plurality 34 of active timers 32 are predicted to expire during the user-configured future time window 40. This provides allows user control of production of a multiple-timer report 23 that relates to expiration of multiple active timers 32.

A single multi-timer query 21 produces a report 23 for multiple timers. The multiple-timer report 23 provides a real life quality of service (QoS) measure and this may be used for accurate system behavior prediction and/or debugging. For example, some but not necessarily all embodiments allow accurate QoS verification before applications are run. This may be used to avoid system overload and/or ensure that applications are granted a proper QoS.

The single multiple-timer query 21 allows a user (e.g., a human being, a software application or another machine) using the apparatus 10 to learn, from the multiple-timer report 23, about the behavior with no or little prior knowledge. For example, some but not necessarily all embodiments allow identification of rogue/malicious/non-efficient applications that consume resources limiting performance. A user may learn from the multiple-timer report 23 that a specific timer 32 is expiring much more frequently than needed which creates an overload on the system. Therefore the user may update some timer attributes to address this problem (e.g. timer duration and/or priority for this example)

In some but not necessarily all embodiments the apparatus 10 may be implemented in hardware to reduce the demands on software.

In some but not necessarily all embodiments the apparatus 10 may use permissions to control the content of the multiple-timer report 23.

FIG. 1 illustrates an example of an apparatus 10 which comprises an input interface 20 configured to enable user configuration 21 of a future time window 40, e.g. by defining for example start time $t_0$ and end time $t_1$ or start time $t_0$ and duration. The future time window 40 extends from a first point in time until a, future, second point in time. The first point in time may for example be the present time, and the time window 40 thus extent from the present time until a future point in time or from a first future point in time until a second later future point in time. The future time window 40 may therefore be defined independently of the present (current) time.

As illustrated in FIG. 3, each of the active timer 32 has a programmed or set expiration time which is indicated by the tip of an arrow on the time axis. A first sub-set 36 of the plurality 34 of timers 32 have expiration times that occur within a, predefined, future time window 40. As shown the subset 36 of timers has its expiration time $t_{expiration}$ within the time window 40.

The apparatus further comprises a report interface 22 configured to produce a report 23 relating to the first sub-set 36 of the plurality 34 of active timers 32, e.g. the subset of active timers of which the expiration time $t_{expiration}$ is predicted to fall within the, user-configured, future time window 40. It will be apparent that the prediction may for example be fairly simple in case the timers all have a fixed expiration time or more complicated if the timers have a variable expiration time. The report 23 therefore relates to active timers in the first sub-set of the plurality of active timers. The active timers in the first sub-set expire during the user-configured future time window 40.

Figure 2:
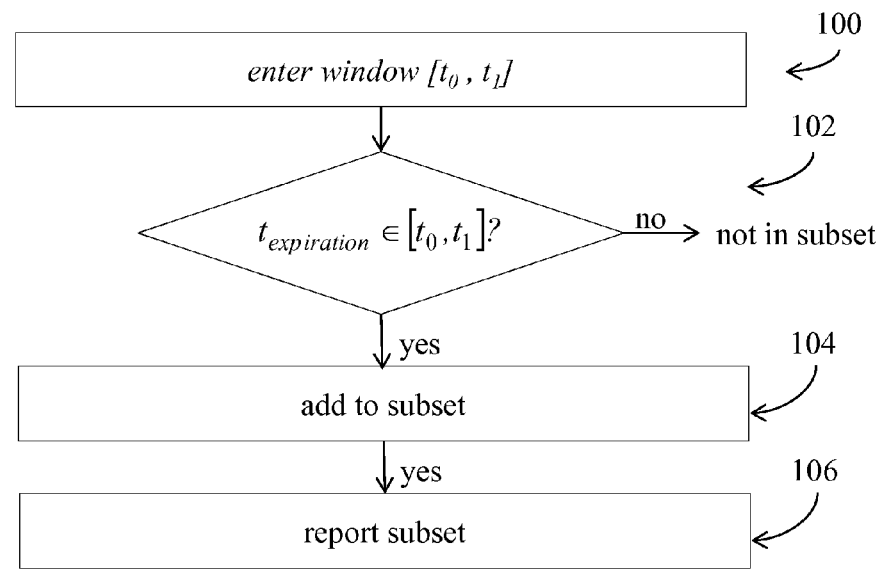
FIG. 2 shows a flow chart of an example of a method.

FIG. 2 illustrates an example of a method that may, for example, be performed by the apparatus 10. The method comprises, as illustrated with block 100, enabling, via an input interface 20, user configuration 21 of a future time window 40. The method 100 then comprises, as illustrated with block 106, producing a report 23 relating to a first sub-set 36 of the plurality 34 of active timers 32 that expire at programmed future points in time. The first sub-set 36 of the plurality 34 of active timers 32 expire during the user-configured future time window 40. As shown with blocks 102 and 104 the report may be generate by finding the active timers with an expiration within the time window and adding those to the set.

Figure 4:
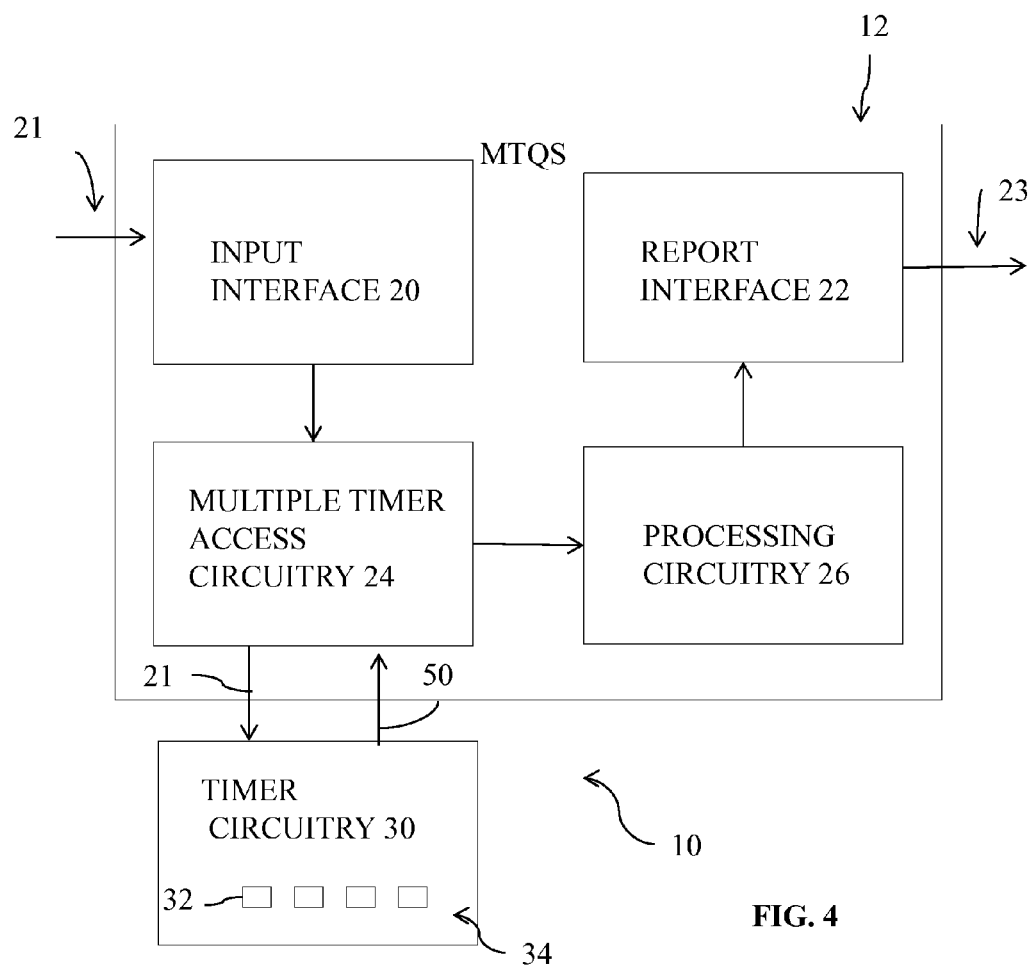
FIG. 4 shows a block diagram of another example of an apparatus comprising: an input interface and a report interface.

FIG. 4 illustrates another example of the apparatus 10. The apparatus 10 comprises a multiple-timer query system (MTQS) 12 and timer circuitry 30.

The timer circuitry 30 is configured to provide a plurality 34 of active timers 32 that expire at programmed future points in time. The timer circuitry 30 can be used to schedule an execution of an event, such as executing a certain task, by the apparatus 10 at a future point in time and with a high resolution. As shown, the timer circuitry 30 may e.g. comprises a software or hardware timer connected to a clock for determining a period of time between a current point in time and a point in time the event is scheduled based on a number of clock cycles of the clock signal. It should be noted that a hardware timer may be used to implement a set of a software timers and may be set to expire at the point in time at which the first software timer expires, the first software timer being the software timer in the set that expires first in time. When the timer expires, the hardware timer may be reset and set to expire when the second software timer expires, the second software timer being the software timer in the set that expires first in time after the first software timer. The timers 32 in this example are created as data structures inside link lists which are organized according to time ticks at external memory. Every timer 32 is represented as a data structure and all of the data structure fields (timer attributes) may be queried.

Figure 5:
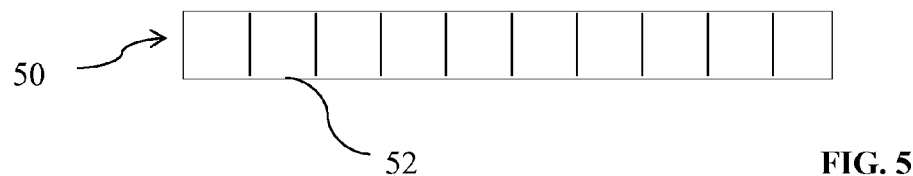
FIG. 5 shows an uninterrupted sequence of information comprised of information from each of a first sub-set of a plurality of active timers.

In the shown example, the MTQS 12 further comprises multiple-timer access circuitry 24 configured to access the timer circuitry 30. Via the multiple-timer access circuitry 24, the MTQS 12 can submit a single multiple-timer query 21 to the timer circuitry 30 and receive information 50 for at least a first sub-set 36 of a plurality 34 of active timers 32 generated in response to the query 21. In some but not necessarily all embodiments, the multiple-timer access circuitry 24 is configured to access the timer circuitry 30 autonomously, to obtain, as an uninterrupted sequence of information 50, information 52 (e.g. timer attributes) for at least each of the first sub-set 36 of the plurality 34 of active timers 32, as illustrated in FIG. 5.

As shown, the MTQS 12 can comprise an input interface 20 configured to receive and store a user configuration of the multiple-timer query 21 including definition of at least a future time window 40. The multiple-timer access circuitry 24 sends the configured multiple-timer query 21 to the timer circuitry 30. In reply to the multiple-timer query 21, the timer circuitry 30 returns information 50 for at least a first sub-set 36 of a plurality 34 of active timers 32.

The MTQS 12 may, as shown, comprise processing circuitry 26 configured to process the information 50 obtained by the multiple-timer access circuitry 24 from the timer circuitry 30 to produce the report 23. The MTQS 12 comprises a report interface 22 configured to output the report 23 relating to the first sub-set 36 of the plurality 34 of active timers 32 that expire at programmed future points in time.

Figure 6:
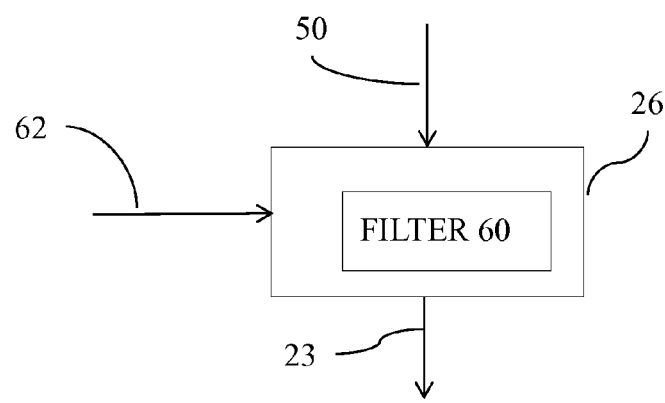
FIG. 6 shows a block diagram of an example of processing circuitry.

FIG. 6 illustrates an example of processing circuitry 26. In this example, but not necessarily all examples, the processing circuitry 26 comprises a filter 60 configured to filter the information 50 obtained by the multiple-timer access circuitry 24 from the timer circuitry 30 to produce the multiple-timer report 23. In the shown example, the information 50 obtained by the multiple-timer access circuitry 24 consists of a second sub-set 38 of the plurality of active timers 34 that expire during the user-configured future time window 40, and of which the first sub-set 36 is a sub-set. The processing circuitry 26 filters based on a set of one or more filter criteria 62 the second sub-set 38 to obtain information 52 for each of the first sub-set 36 of the plurality of active timers 32.

In some but not necessarily all embodiments, one or more of the filter criteria 62 may be user access permissions. In this scenario, the second sub-set 38 may be the set of all of active timers 32 that expire during the user-configured future time window 40. The first sub-set 36 may be those of the second sub-set 38 which the user has permission to access according to the user access permissions set for the timers. For example, there may be two or more protection classes e.g. USER and OS (Operating System). Let's assume that access to the USER class does not provide access to the OS class. If the filter criteria 62 is USER, the report 23 includes information for timers 32 which relate to the USER process ID. None of the OS timers will be included in the report 23.

In some but not necessarily all embodiments, the filter criteria 62 may comprise one or more user access permissions and/or one or more other query attributes. In some but not necessarily all embodiments, one or more of the filter criteria may be one or more query attributes defined during the user configuration of the multiple-timer query 21. The input interface 20 may be configured to enable user configuration 21 of the multiple-timer query 21 by defining query attributes in addition to the future time window 40. Examples of timer attributes and query attributes suitable for the filter include but are not limited to: specific timer characteristics, a software thread that is activated on expiration of a timer, a priority for an action on expiration of a timer, a software thread ID which is later interpreted as a software code address which should be loaded and executed, user data which should be used on expiration of the timer, user IDs, application IDs, debug information.

As a result of the filtering by the filter 60, the processing circuitry 26 sends to the report interface 22 information about the first subset only and the report interface can output a report 23 relating only to those active timers 32 that expire during the user-configured future time window 40 and have timer attributes that satisfy the query attributes used as filter criteria 62.

Figure 7:
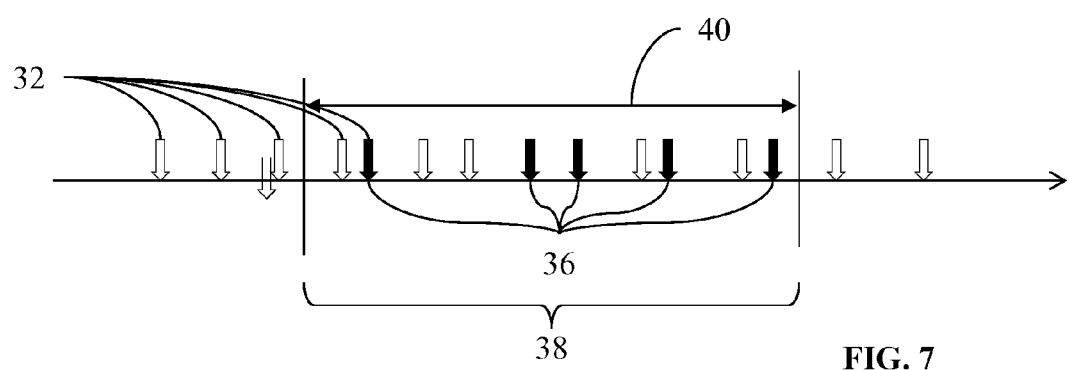
FIG. 7 schematically shows timing diagram illustrating an example of filtering in respect of timers that expire during a future time window.
Figure 8:
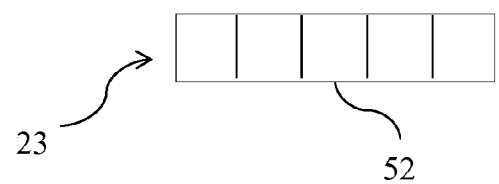
FIG. 8 schematically shows an example of a multiple-timer report produced by the filtering of FIG. 7.

An example of this filtering is illustrated schematically in FIG. 7 and the consequential report 23 is illustrated in FIG. 8. The report 23 relating to the first sub-set 36 of the plurality 34 of active timers 32 comprises at least an indication of a timer expiration time for each of the first sub-set 36 of the plurality 34 of active timers 32. The report 23 may additionally comprise, for each of the first sub-set 36 of the plurality 34 of active timers 32, one or more timer attributes that determine a consequence of timer expiry.

Figure 9:
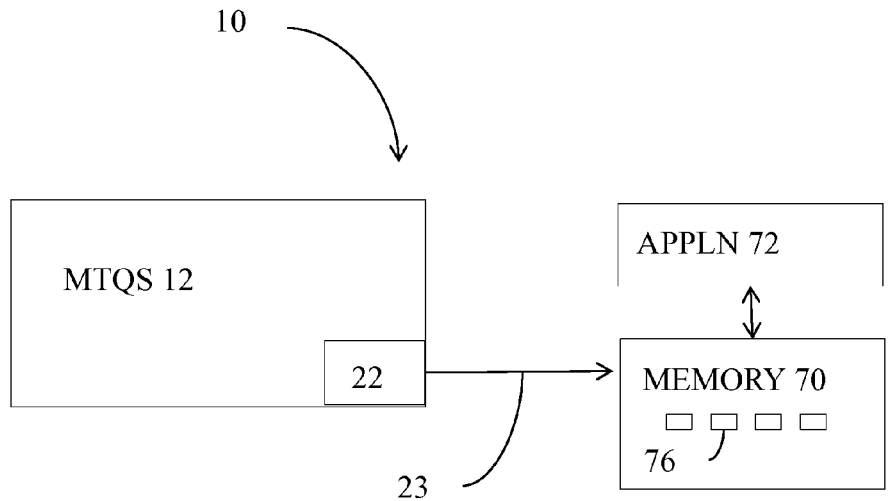
FIG. 9 shows a block diagram of another example of an apparatus comprising a memory for storing the multiple-timer report.

FIG. 9 illustrates an example of an apparatus 10 that in addition to the MTQS 12 comprises a memory 70. In this example, the report interface 22 of the MTQS 12 is connected to the memory 70 and arranged to store the multiple-timer report 23 relating to the first sub-set 36 of the plurality 34 of active timers 32 as one or more data structures 76 in one or more accessible memory spaces in the memory 70.

The memory 70 is accessible by applications 72, e.g. software applications. The report 23 is stored in the memory 70 and is accessed by the applications 72. The applications may be run on the apparatus 10 or on another device such as, for example, a host device for the apparatus 10, and connected to the memory 70. An application 72 may have direct and immediate access to the memory 70 and the data stored there without the need for creating intermediate data structures.

In addition, in some but not necessarily all embodiments, an application 72 can create a multiple-timer query 21 and then store the multiple-timer report 23 created in response to the multiple-timer query 21 in the memory 70. The same application 72 can use the stored report 23 again without creating another multiple-timer query 21. Also a different application 72 can re-use the stored report 23 without creating or using another multiple-timer query 21.

Figure 10:
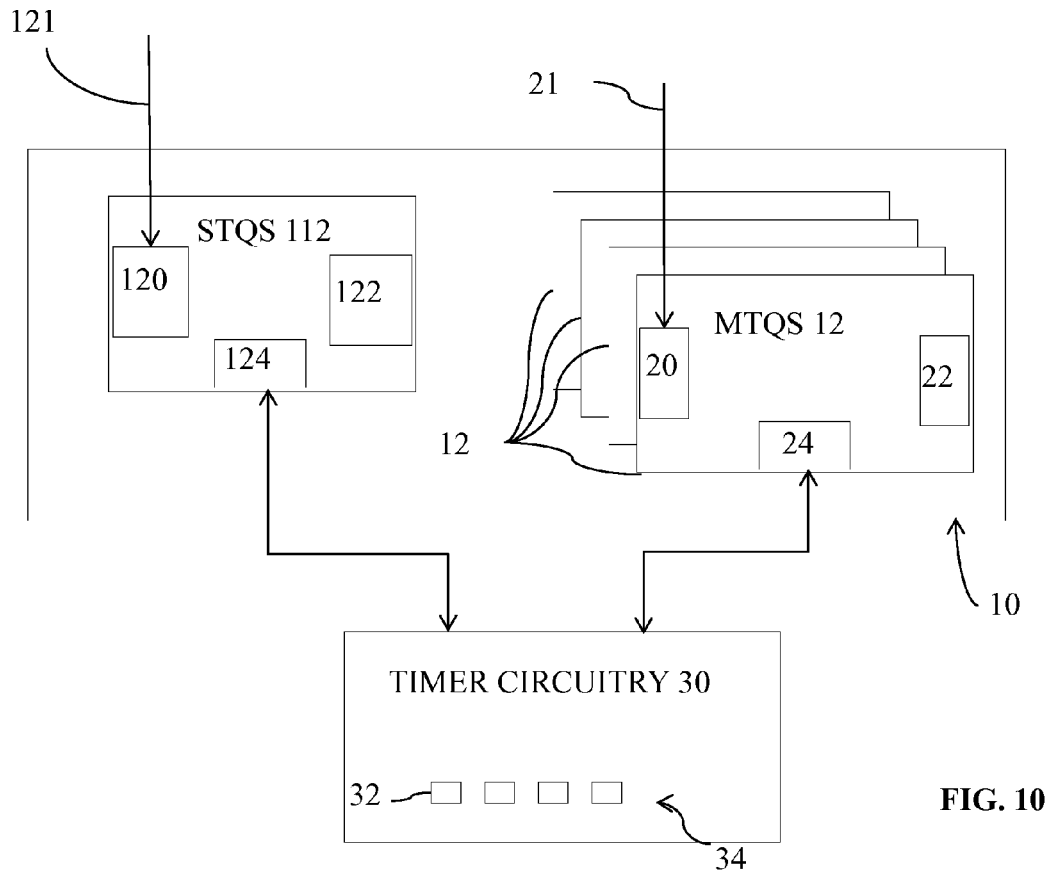
FIG. 10 shows a block diagram of an example of another apparatus comprising a single-timer query system and one or more multiple-timer query systems.

FIG. 10 illustrates an example of an apparatus 10 that comprises a MTQS 12, for example, as illustrated in FIG. 4. In this example, the apparatus 10 may comprise one or more MTQS 12 which operate independently, each of which may be implemented as in the example of FIG. 4 for instance. In this example, the apparatus 10 additionally comprises a single query timer system (STQS) 112.

The single-timer query system (STQS) 112 comprises: a single-timer query interface 120; single-timer access circuitry 124; and a single-timer report interface 122. The single-timer query interface 120 has an input at which a single-timer query 121 can be received. The single-timer access circuitry 124 is configured to access a single timer 32 of a plurality 34 of timers 32 in timing circuitry 30 and to obtain information there from corresponding to, and in response to submitting, the single timer query 121. The single-timer report interface 122 is configured to produce a report relating to only the accessed single timer 32.

As shown in FIG. 10, the STQS 112 and the one or more MTQS 12 may be connected to the same timing circuitry 30 and the timers 32. In some but not necessarily all examples, each of the one or more MTQS 12 has read-only access to the timer circuitry 30. A MTQS 12 cannot therefore change the timers 32. In some but not necessarily all examples, each of the one or more MTQS 12 only have write capabilities via the report interface 22.

FIG. 11 illustrates an example of an apparatus 10 which comprises timer control circuitry 63 comprising a STQS 112. The timer control circuitry 63 creates timers 32 in the memory 70. A free running clock 65 generates a n bits wide counter. The clock 65 in this example is a Master Wall Clock (MWC). The clock 65 provides input to the timer control circuitry 63 and the one or more MTQS 12.

As shown, the apparatus 10 also comprises one or more MTQS 12. A configuration module 61 is configured to provide input to the input interface 22 of the one or more MTQS 12. The configuration module may, for example, specify attributes of multiple-timer queries 21.

FIG. 12 illustrates an example of the apparatus 10 implemented in an integrated circuit (IC) 200. The integrated circuit 200 may, for example, comprises one or more than one dice in a common integrated circuit package, and e.g. be formed using photolithography on a monolithic semiconductor substrate. In some but not necessarily all examples the IC 200 may comprise a hardware accelerator that provides a timer manager for millions of timers. In some but not necessarily all examples the IC 200 may comprise an application specific integrated circuit, field programmable gates arrays, a network processor or other microprocessor, or a system on chip (SoC).

Referring to FIG. 12, the integrated circuit 200 shown therein comprises an integrated circuit data processing device, for example a microprocessor, such as a general purpose microprocessor, a microcontroller, a digital signal processor or other suitable type of SoC. The microprocessor may for example comprise one, two or more central processing units (CPU) or cores. Additionally, the microprocessor may comprise one or more peripherals, such as hardware accelerators, co-processors or otherwise, and/or memory, such as on-chip flash or RAM. As shown in FIG. 12, the microprocessor 1 may include one or more processor cores 10 for executing instructions provided to the microprocessor 1. In FIG. 1, two cores 10 are shown however the microprocessor may have more cores, e.g. 4, 8, 16, 32, 64 or any other number suitable for the specific implementation. The processor core may for instance include the logic required to execute program code in the form of machine code. The processor core 10 may for instance at least include an instruction decoder, an arithmetic unit, an address generation unit, and a load/store unit.

The microprocessor may for example include, in addition to the processor core, inputs/outputs or other components, such as and/or communication interfaces and/or coprocessors and/or analog-to-digital converters and/or clocks and reset generation units, voltage regulators, memory (such as for instance flash, EEPROM, RAM), error correction code logic and/or timers or other suitable components. In the shown example, in addition to the core 10, peripherals 2-4 are shown to be present, in this example connected to the cores 10 via a bus 5. For example, the peripherals may include a data packet processing accelerator or I/O co-processor (AIOP) 2 which uses timers to schedule the processing of data packets, and in which e.g. a timer query system as in FIG. 4 is implemented.

The invention may also be implemented in a computer program for running on a programmable apparatus, at least including code portions for performing a method according to the invention when run on a programmable apparatus, such as a microprocessor, or enabling a programmable apparatus to perform functions of an apparatus according to the invention.

A computer program is a list of instructions such as a particular application program and/or an operating system.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible non-transitory computer readable storage medium, e.g. as shown in FIG. 13, or transmitted to the computer system via a computer readable transmission medium. All or some of the computer program may be provided on computer readable storage media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc., just to name a few.

In the foregoing specification, the invention has been described with reference to specific examples of embodiments of the invention. It will, however, be evident that various modifications and changes may be made therein without departing from the broader scope of the invention as set forth in the appended claims and that the examples are merely illustrative and not intended to be restrictive.

Some of the above embodiments, as applicable, may be implemented using a variety of different information processing systems. For example, although FIGS. 1, 4, 9 and 10 and the discussion thereof describe exemplary information processing architectures, these exemplary architectures are presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of apparatus 10 are circuitry located on a single integrated circuit or within a same device. Alternatively, apparatus 10 may include any number of separate integrated circuits or separate devices interconnected with each other. For example, memory 70 may be located on a same integrated circuit as MTQS 12 or on a separate integrated circuit or located within another peripheral or slave discretely separate from other elements of apparatus 10.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. An apparatus comprising:
a memory;
timer circuitry to implement a plurality of active timers, the timers implemented as link lists including data structures stored at the memory;
timer access circuitry operating autonomous to the timer circuitry, the timer access circuitry to access the timer circuitry and provide an application interface, the application interface comprising:
an input interface configured to enable configuration of a future time window; and
a report interface configured to produce a report in response to a query, the report identifying a first sub-set of the plurality of active timers set to expire during the configured future time window, and to store the report at the memory, the stored report accessible by a software application, the software application to perform quality of service verification based on the stored report and to regulate initiation of processes based on the quality of service verification.

2. An apparatus as claimed in claim 1, wherein the timer access circuitry is configured to access the timer circuitry autonomously, responsive to configuration of the future time window, to obtain, as an uninterrupted sequence, information for at least each of the first sub-set of the plurality of active timers.

3. An apparatus as claimed in claim 1, further comprising processing circuitry configured to process the information obtained by the timer access circuitry from the timer circuitry to produce the report.

4. An apparatus as claimed in claim 3, wherein the processing circuitry is configured to filter the information obtained by the timer access circuitry from the timer circuitry to produce the report.

5. An apparatus as claimed in claim 3, wherein the processing circuitry is configured to produce the report by filtering information obtained by the timer access circuitry from a second sub-set of the plurality of active timers that expire during the configured future time window, to obtain information for the first sub-set of the plurality of active timers that expire during the configured future time window.

6. An apparatus as claimed in claim 5, wherein the filtering is based on identifying timers that the an application has permission to access.

7. An apparatus as claimed in claim 1, wherein the plurality of active timers are configured to expire at programmed future points in time.

8. An apparatus as claimed in claim 1, wherein the input interface is further configured to enable configuration of query attributes; and wherein the report interface is configured to produce the report relating to the first sub-set of the plurality of active timers that satisfy the query attributes.

9. An apparatus as claimed in claim 1, wherein the report relating to the first sub-set of the plurality of active timers comprises at least an indication of a timer expiration time for each of the first sub-set of the plurality of active timers.

10. An apparatus as claimed claim 1, wherein the report relating to the first sub-set of the plurality of active timers additionally comprises, for each of the first sub-set of the plurality of active timers, one or more timer attributes that determine a consequence of timer expiry.

11. An apparatus as claimed in claim 1, wherein the report interface is configured to store the report relating to the first sub-set of the plurality of active timers as one or more data structures in one or more accessible memory spaces at the memory.

12. An apparatus as claimed in claim 1, comprising:
a single-timer query system comprising:
a single-timer query interface configured to receive a single-timer query;
single-timer access circuitry configured to access a single timer of a plurality of timers; and
a single-timer report interface configured to produce a report relating to only the accessed single timer, and
a multiple-timer query system comprising:
the input interface configured as a multiple-timer query interface configured to receive a multiple-timer query that configures a future time window;
multiple timer access circuitry configured to access at least the first sub-set of the plurality of timers;
the report interface, configured as a multiple-timer report interface, configured to produce a report relating to the first sub-set of the plurality of active timers that expire at programmed times, wherein the first sub-set of the plurality active timers are predicted to expire during the configured future time window.

13. An apparatus as claimed in claim 12, further comprising one or more additional multiple-timer query systems, each comprising:
a multiple-timer query interface configured to receive a multiple-timer query that configures a future time window;
multiple timer access circuitry configured to access a sub-set of the plurality of timers that expire at programmed future points in time, during the future time window; and
a multiple-timer report interface, configured to produce a report relating to the sub-set of the plurality of active timers that are predicted to expire at programmed future points in time, during the future time window.

14. An apparatus comprising:
a memory;
timer circuitry to implement a plurality of active timers, the timers implemented as link lists including data structures stored at the memory;
timer access circuitry operating autonomous to the timer circuitry, the timer access circuitry to access the timer circuitry and provide an application interface, the application interface comprising:
a single-timer query system comprising:
a single-timer query interface configured to receive a single-timer query;
single timer access circuitry configured to access a single timer of a plurality of timers; and
a single-timer report interface configured to produce a report relating to only the accessed single timer and store the report at the memory, the stored report accessible by a software application; and
a multiple-timer query system comprising:
a multiple-timer query interface configured to receive a multiple-timer query, the multiple-timer query including configuration of a future time window;
multiple timer access circuitry configured to access the plurality of timers; and
a multiple-timer report interface configured to produce a report in response to a query, the report identifying a first sub-set of the plurality of active timers set to expire during the future time window, and to store the report at the memory, the stored report accessible by a software application, the software application to perform quality of service verification based on the stored report and to regulate initiation of processes based on the quality of service verification.

15. An apparatus as claimed in claim 14, configured as an integrated circuit.

16. An apparatus as claimed in claim 14, configured as a hardware accelerator that provides a timer manager for millions of timers.

17. A method comprising:
maintaining a plurality of active timers, the timers implemented as link lists including data structures stored at a memory;
receiving, at an application interface operating autonomous to the plurality of active timers, configuration information specifying a future time window, the configuration information received via an input interface provided by timer access circuitry;
producing a report identifying a first sub-set of the plurality of active timers set to expire during the configured future time window; and
storing the report at the memory, the stored report accessible by a software application using the application interface, the software application to perform quality of service verification based on the stored report and to regulate initiation of processes based on the quality of service verification.

* * * * *